United States Patent
Pirzadeh et al.

(10) Patent No.: US 6,874,118 B1
(45) Date of Patent: Mar. 29, 2005

(54) EFFICIENT STORAGE AND ERROR RECOVERY OF MOVING PICTURES EXPERTS GROUP (MPEG) VIDEO STREAMS IN AUDIO/VIDEO (AV) SYSTEMS

(75) Inventors: Sean Pirzadeh, Palo Alto, CA (US); Jason Hong, Lincoln, CA (US)

(73) Assignee: Maxtor Corporation, Longmont, CO (US)

( * ) Notice: Subject to any disclaimer, the term of this patent is extended or adjusted under 35 U.S.C. 154(b) by 593 days.

(21) Appl. No.: 09/953,188

(22) Filed: Sep. 17, 2001

(51) Int. Cl.[7] .............................................. H03M 13/00
(52) U.S. Cl. ...................... 714/776; 386/111
(58) Field of Search ................. 714/776, 746; 360/53, 31, 25; 386/111; 704/200.1; 365/187

(56) References Cited

U.S. PATENT DOCUMENTS 5,784,527 A * 7/1998 Ort .............................. 386/111
2001/0025239 A1 * 9/2001 Hakenberg et al. ...... 704/200.1

* cited by examiner

*Primary Examiner*—Phung My Chung
(74) *Attorney, Agent, or Firm*—Myers Bigel Sibley & Sajovec, P.A.

(57) ABSTRACT

A system and improved method are provided for storage and error recovery of streams of MPEG data on storage media in audio/visual systems. Storage locations on the storage media are selected for streams of MPEG data according to the data rates of the streams of MPEG data and the properties of the available storage locations on the storage media. Error recovery is selectively implemented based on the content of the streams of MPEG data, and transmission bandwidth of the streams of MPEG data is maximized.

24 Claims, 6 Drawing Sheets

EFFICIENT STORAGE AND ERROR RECOVERY OF MOVING PICTURES EXPERTS GROUP (MPEG) VIDEO STREAMS IN AUDIO/VIDEO (AV) SYSTEMS

BACKGROUND OF THE INVENTION

1. Field of the Invention

The present invention, in certain respects, relates to storage media. In other respects, the present invention relates to the storage and error recovery of MPEG data on hard disk drives.

2. Description of Related Art

In existing computer systems, the hard disk drive is normally expected to take the necessary time to recover from errors that may be detected in data stored on the hard disk drive. The rationale for the hard disk drive taking the necessary recovery time is based upon the fact that data stored on the hard disk drive has typically been of a nature that cannot tolerate errors, e.g., word processing files, spread sheets, and the like.

With the introduction of audio/visual data storage in the form of compressed streams of data such as MPEG-1, MPEG-2, etc., the focus has changed from the need to correct all data errors to an importance of sustained throughout and timely delivery of data. In particular, some errors will impact only one or a few frames of a, for example, 30 frames per second signal and may be undetectable to a user. If the audio/visual stream were delayed to perfectly correct all such errors, then a break or lag would result in the audio/visual output and thereby the output would be unacceptable to the user. The MPEG decoding module may also take measures to conceal errors if errors are flagged by the storage device.

MPEG-type data streams consist of a series of frames of data. Each of these frames of data may be one of three types of frame. The first type is an intra-frame, or I-frame. I-frames are encoded in their entirety within a stream, without reference to other frames. The second type is an inter-frame predicted frame, or P-frame. A P-frame is coded with reference to the nearest previous I-frame or P-frame. Usually, a motion compensation technique is used to generate the P-frames. The third type is a bi-directional predicted/interpolated frame, or B-frame. B-frames are created by referring to the nearest past and future I- and P-frames. B-frames are never used as references for other B- or P-frames. Therefore, an error in an I-frame could propagate through a large portion of a stream because it is used as a reference for the greatest number of other frames. An error in a P-frame is also used as a reference, and thus could propagate as well. However, an error in a B-frame will be limited to a single frame.

Parts of a single frame of MPEG data may also create errors more significant than in other parts of the same frame because of limitations of the human eye and ear. For instance, the eye is more sensitive to changes in brightness than to chromaticity. Therefore, an error in a chrominance component of a frame is less likely to disrupt the output than an error in a luminance component, from a viewer standpoint. Likewise, errors in the center of an image may disturb a viewer more than errors at the periphery of the image.

Current hard disk drives for computers assign storage priority to files or objects by finding available storage locations sufficiently large to hold the file or object. When determining the storage allocations, the hard disk drive is unaware of the nature of the data it is storing, and the host is unaware of the properties of the available storage locations. There is no way to optimize the selection of a storage location by factoring in the nature of the data to be stored. In the case of audio/visual data, the selection of a storage location that is not optimized for a high bit-rate stream results in decreased allowable overhead for error recovery and thus, ultimately, discontinuity, or distortion of the audio/visual output when errors are encountered. Note that this allowable error recovery overhead budget is a function of media/disk bitrate, MPEG stream bitrate, and the available amount of data buffer in the storage device (hard drive).

SUMMARY OF THE INVENTION

The present invention is provided to improve techniques for storage and error recovery of streams of MPEG data on a storage media. In the present invention, methods for storage and error recovery of streams of MPEG data on a storage media are provided that increase the observability and bandwidth of a video or audio output associated with the stream of MPEG data. These methods include intelligent implementation of error recovery based on content and selection of storage locations on the storage media according to the data rate of the MPEG data.

The present invention, in an embodiment, is directed toward a system or method, or one or more components thereof, for storing and recovering errors in streams of MPEG data on a storage media. In this embodiment, the system identifies at least one stream of MPEG data being transmitted from a system bus to the storage media and identifies a respective transmission data rate of each of the at least one stream of MPEG data. The system or method further selects a storage location from among a set of available storage locations on the storage media, the selected storage location maximizing the bandwidth for an output display of each of the at least one stream of MPEG data. The system or method also selectively implements at least one error recovery algorithm based on the content of the at least one stream of MPEG data to maximize the transmission bandwidth of the at least one stream of MPEG data. The system also comprises storing each of the at least one stream of MPEG data in the selected storage location on the storage media.

In another embodiment, the present invention is directed at a method or system for recovering errors in streams of MPEG data. In this embodiment, the invention identifies at least one stream of MPEG data being transmitted between a system bus and a storage media. The system then selectively implements at least one error recovery algorithm based on the content of the at least one stream of MPEG data to maximize transmission bandwidth and timely delivery retrieval of the at least one stream of MPEG data.

BRIEF DESCRIPTION OF THE DRAWINGS

The present invention is further described in the detailed description which follows, by reference to the noted drawings by way of non-limiting exemplary embodiments, in which like reference numerals represent similar parts throughout the several views of the drawings, and wherein.

DETAILED DESCRIPTION

The following detailed description refers to the accompanying drawings that illustrate embodiments of the present invention. Other embodiments are possible and modifications may be made to the embodiments without departing from the spirit and scope of the invention. Therefore, the following detailed description is not meant to limit the invention. Rather, the scope of the invention is defined by the appended claims.

Furthermore, it will be apparent to one of ordinary skill in the art that the embodiments as described below may be implemented in many different embodiments of software, firmware, and hardware in the entities illustrated in the figures. The actual software code or specialized control hardware used to implement the present invention is not limiting of the present invention. Hence, the operation and behavior of the embodiments will be described without specific reference to the actual software code or specialized hardware components. It is understood that artisans of ordinary skill would be able to design software and control hardware to implement the embodiments of the present invention based on the description herein.

Figure 1:
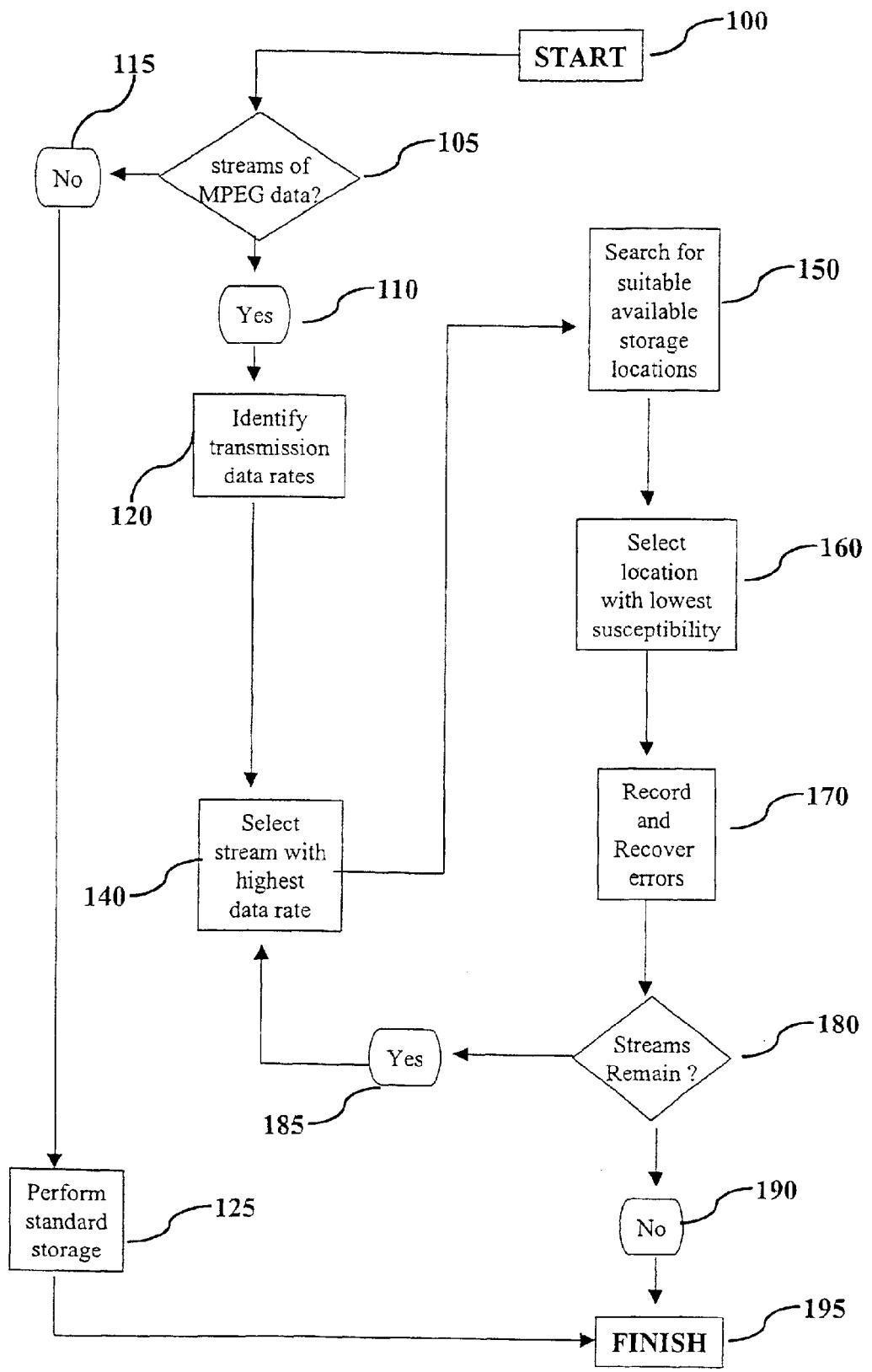
FIG. 1 is a flow diagram illustrating the method of selecting storage locations for individual streams of MPEG data based upon susceptibility to shock and vibration.

Referring now more particularly to the drawings, FIG. 1 illustrates an embodiment of the invention wherein storage locations 20 on a storage media 10 are selected according to their susceptibility to external shock and vibration.

More specifically, in such an embodiment, when a system detects incoming data to be stored on the storage media 10, the system starts a storage selection process at block 100. At block 100, control moves to block 105. At block 105, a MPEG identification process is performed. Streams of MPEG data can be identified by signature elements that exist in any stream of MPEG data. The MPEG identification process may also include flagging the identified streams of MPEG data in order to facilitate future identification, storage, and retrieval of the streams of MPEG data. If the incoming data is found to not be MPEG data, control moves to block 115. If the incoming data is found to be at least one stream of MPEG data, control moves to block 110.

At block 115, control moves to block 125. At block 125, the system performs a standard storage procedure for non-MPEG data, and control moves to block 195.

At block 110, control moves to block 120. At block 120, the system performs a transmission data rate determination process. The transmission data rate, or bitrate, is the rate at which the stream of MPEG data is transferred to and from the hard drive, and the rate at which it is played upon output. Information indicating the bitrate is imbedded in any stream of MPEG data. The bitrate information may be one of the signature elements used to identify MPEG data in the MPEG identification process performed at block 105. Thus, although in this embodiment the MPEG identification process and the transmission data rate determination process are depicted as separate processes, they may be performed substantially simultaneously. The transmission data rate determination process may also include flagging the identified streams of MPEG data with their respective identified data rates. Once the streams of MPEG data have been identified and their respective bitrates determined in block 120, control moves to block 140.

At block 140, the system performs a bitrate selection process, wherein the stream of MPEG data with the highest bitrate is selected from among the streams with identified data rates. Once the stream with the highest bitrate has been selected, control moves to block 150.

At block 150, the system performs a search on the storage media 10 for all storage locations 20 that are both available and sufficiently large to store the selected stream. Once the system has found all of the suitable available storage locations, control moves to block 160.

At block 160, the system performs a shock and vibration susceptibility selection process. The shock and vibration susceptibility selection process selects a storage location with the lowest susceptibility to external shock and vibration from among the set of all suitable available storage locations found in block 150.

The susceptibility to external shock and vibration of each of the suitable available storage locations is based upon known mechanical properties of the storage media 10, which would be stored in a data file on the storage media 10 or elsewhere within the system.

Figure 5:
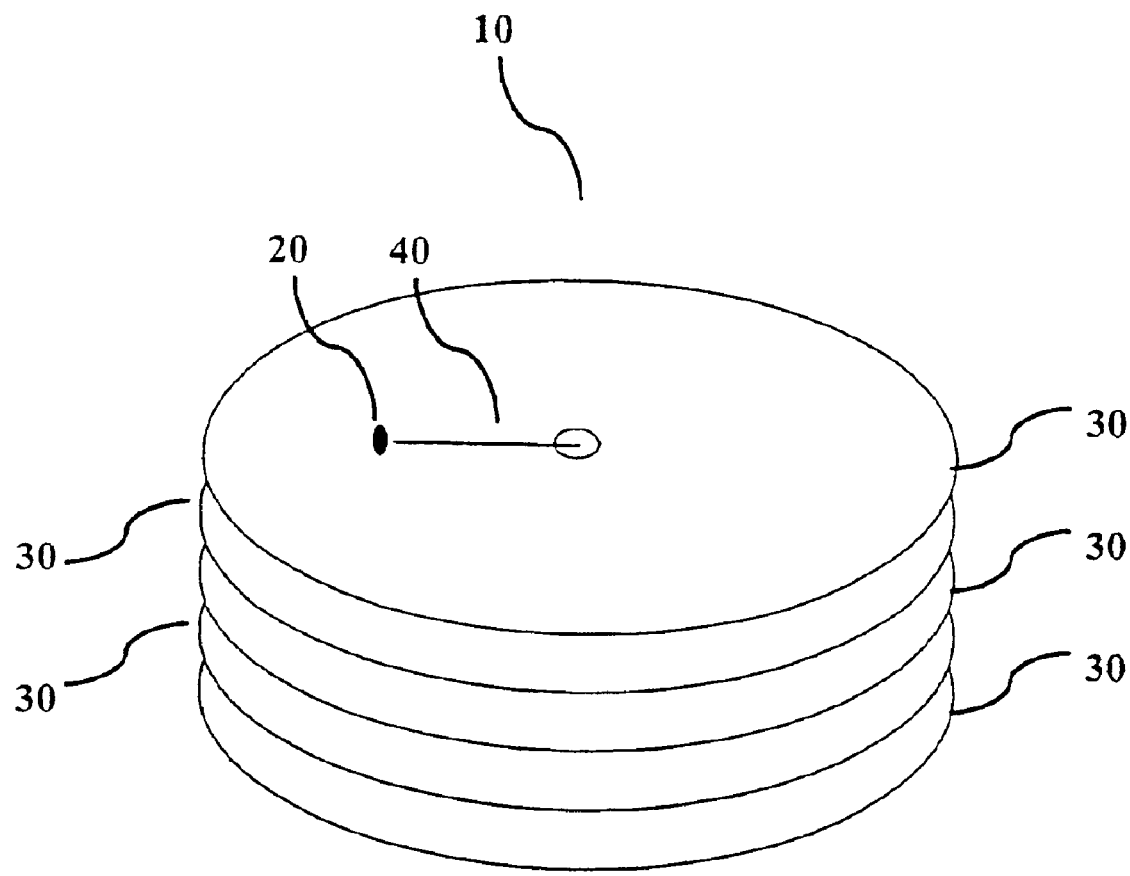
FIG. 5 is a schematic illustration of the placement of a storage location on a hard disk drive.

In the case of the storage media 10 being a hard disk drive, as shown in FIG. 5, consisting of at least one disk-shaped platter 30, the susceptibility to external shock and vibration of a storage location 20 is determined by the physical location of the storage location 20 on its respective platter 30. Specifically, storage locations 20 placed at a low radius 40 on a platter 30 have a lower susceptibility to shock and vibration than storage locations 20 placed at a higher radius 40 on the same platter 30. Thus, in the case of a hard disk drive, the suitable available storage location with the lowest susceptibility to external shock and vibration is the suitable available storage location located at the lowest radius on its respective platter.

Once the stream with the highest data rate has been selected and the suitable available storage location with the lowest susceptibility to shock and vibration has been selected in block 160, control moves to block 170.

Figure 4:
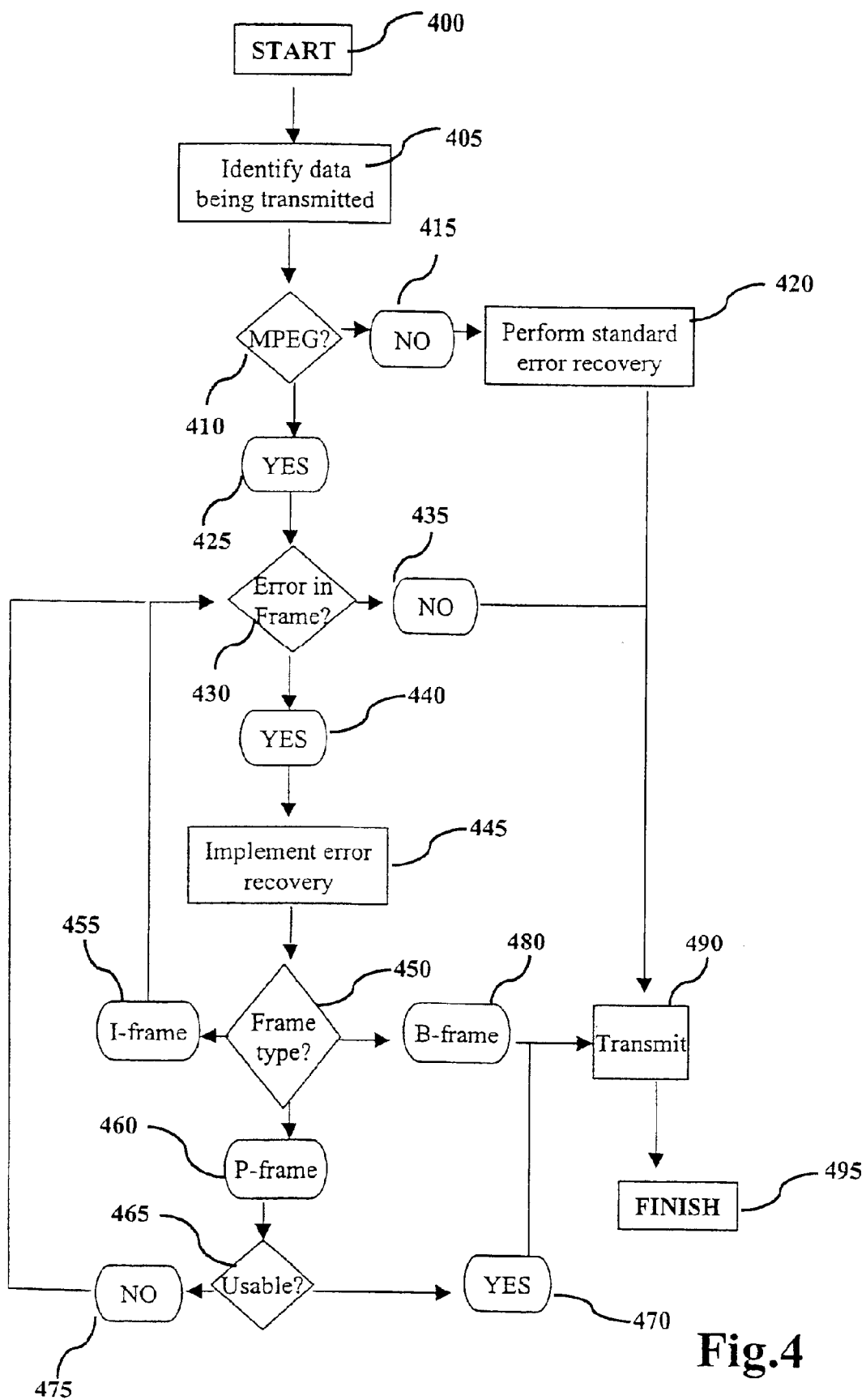
FIG. 4 is a flow diagram illustrating the selective implementation of error recovery based upon the content of the stream of MPEG data.

At block 170, the system performs a recording and error recovery process wherein the stream selected in block 140 is checked for errors, attempts are made to correct any errors, and the stream is recorded on the storage location selected in block 160. Preferably, the error recovery process is as depicted in FIG. 4, which will be described later. The recording process may also include the creation or alteration of a data file associating any flags placed on the stream during the MPEG identification process and the transmission data rate determination process with one of the file name for the selected stream of MPEG data and the selected storage location. Once the stream with the highest data rate is recorded on the storage location with the lowest susceptibility to external shock and vibration on the storage media 10, control moves to block 180.

At block 180, the system checks for any remaining streams to be recorded. If at least one stream to be recorded is found at block 180, control moves to block 185. If streams to be recorded are not found at block 180, control moves to block 190.

At block 185, control moves to block 140. Thus, the transmission data rate selection process, the search for suitable available storage locations, the susceptibility selection process, and the recording and error recovery process are repeated until all of the streams found in block 105 are recorded on the storage media 10.

At block 190, control moves to block 195. At block 195, the process is finished.

Figure 2:
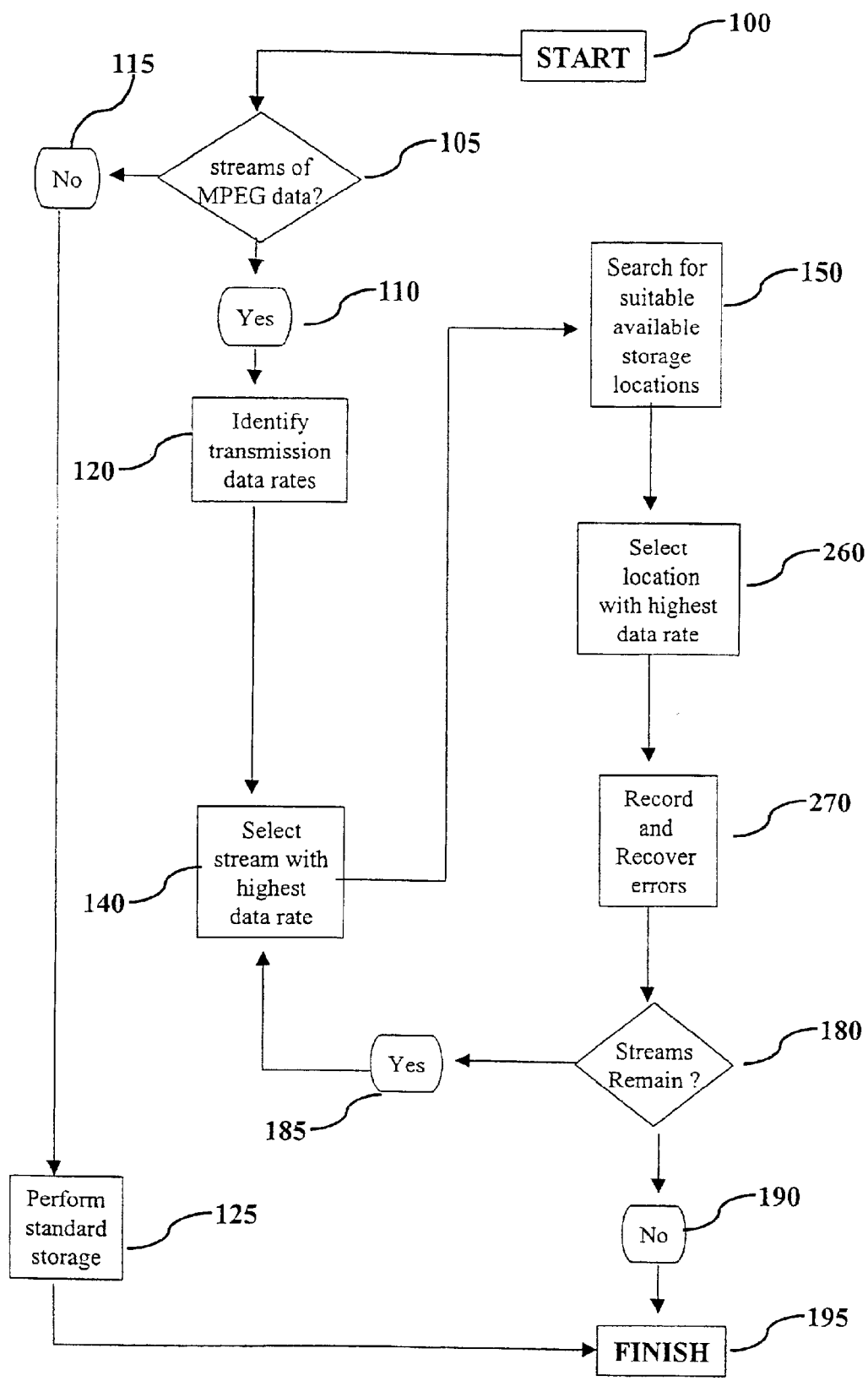
FIG. 2 is a flow diagram illustrating the method of selecting storage locations for individual streams of MPEG data based upon raw data rate.

FIG. 2 illustrates an embodiment of the invention wherein storage locations 20 on a storage media 10 are selected according to their raw data rate.

More specifically, this embodiment performs the MPEG identification process 105, the transmission data rate determination process 120, the transmission data rate selection process 140, and the search for suitable available storage locations 150 in the same manner as discussed above with respect to the embodiment depicted in FIG. 1. After the system finds all of the suitable available storage locations in block 150, control moves to block 260.

At block 260, the system performs a raw data rate selection process wherein the suitable available storage location with the highest raw data rate is selected from among the set of all suitable available storage locations.

The raw data rate of each of the suitable available storage locations is based upon known mechanical properties of the storage media 10 which would be stored in a data file on the storage media 10 or elsewhere within the system.

In the case of the storage media 10 being a hard disk drive, as shown in FIG. 5, consisting of at least one disk-shaped platter 30, the raw data rate of a storage location 20 is determined by the physical location of the storage location 20 on its respective platter 30. Specifically, storage locations 20 placed at a low radius 40 on a platter 30 have a lower raw data rate than storage locations 20 placed at a higher radius 40 on the same platter 30. Thus, the suitable available storage location with the highest raw data rate is the suitable available storage location located at the highest radius on its respective platter.

Once the stream with the highest transmission data rate has been selected and the suitable available storage location with the highest raw data rate has been selected at block 260, control moves to block 270.

At block 270, the system performs a recording and error recovery process wherein the stream selected in block 140 is checked for errors; attempts are made to correct any errors, and the stream is recorded on the storage location selected in block 260. Preferably, the error recovery process is as depicted in FIG. 4, to be described later. The recording process may also include the creation or alteration of a data file associating any flags placed on the stream during the MPEG identification process and the transmission data rate determination process with one of the file name for the selected stream of MPEG data and the selected storage location. Once the stream with the highest data rate is recorded on the storage location with the highest data rate on the storage media 10, control moves to block 180.

At block 180, the system checks for any remaining streams to be recorded. If at least one stream to be recorded is found at block 180, control moves to block 185. If streams to be recorded are not found at block 180, control moves to block 190.

At block 185, control moves to block 140. Thus, the transmission data rate selection process, the search for suitable available storage locations, the raw data rate selection process, and the recording and error recovery process are repeated until all of the streams found in block 105 are recorded on the storage media 10.

At block 190, control moves to block 195. At block 195, the process is finished.

Figure 3:
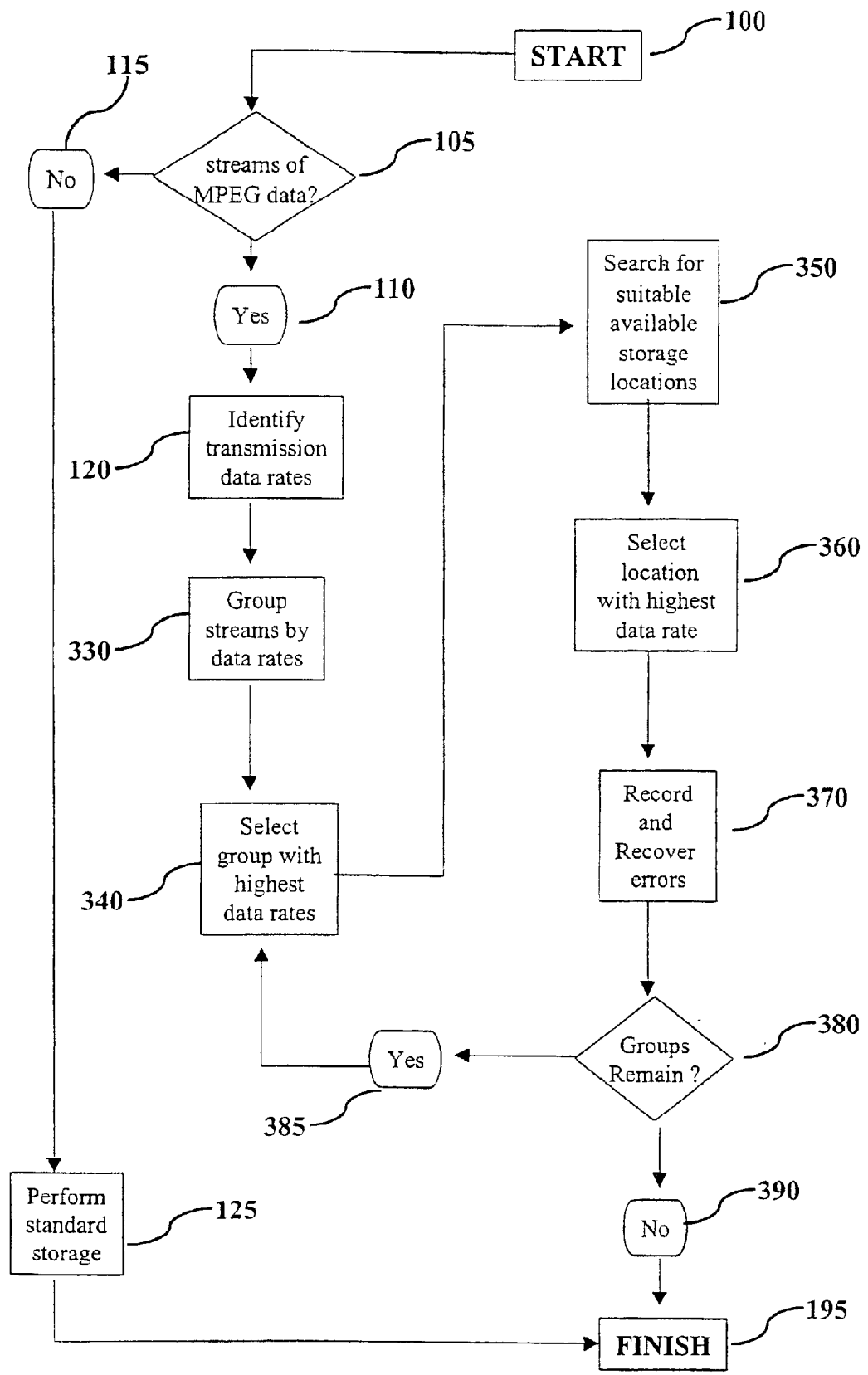
FIG. 3 is a flow diagram illustrating the method of selecting storage locations for groups of MPEG data based upon raw data rate.

FIG. 3 illustrates an embodiment of the invention wherein storage locations 20 on a storage media 10 are selected according to their raw data rate, and further wherein the streams of MPEG data are placed into groups prior to being recorded.

More specifically, this embodiment performs the MPEG identification process 105 and the transmission data rate determination process 120 in the same manner as the embodiments depicted in FIGS. 1 and 2. Once the streams of MPEG data have been identified and their respective transmission data rates determined in block 120, control moves to block 330.

At block 330, the system performs an MPEG grouping process, wherein the identified streams with determined data rates are placed into groups of MPEG streams with similar data rates. These groups may be created, for example, by defining ranges of data rates for each group and placing streams in the groups including their respective data rates, regardless of overall size of the group. The groups may also, for example, be created by defining a group size and placing the streams into groups, starting with the highest or lowest data rates, until a group is full, regardless of the range of data rates covered by the group. Other techniques for creating these groups may be used, as long as the resulting groups contain streams having substantially similar data rates. Once the groups of streams with similar data rates have been created, control moves to block 340.

At block 340, the system performs a group data rate selection process wherein the group containing the streams with the highest data rates is selected from among the set of all groups of streams with similar data rates. Once the group of streams with the highest data rates has been selected, control moves to block 350.

At block 350, the system performs a search on the storage media 10 for all storage locations 20 that are both available and sufficiently large to store the selected group of streams. Once the system has found all of the suitable available storage locations, control moves to block 360.

At block 360, the system performs a raw data rate selection process wherein the suitable available storage location with the highest raw data rate is selected from among the set of all suitable available storage locations. The raw data rate of each of the suitable available storage locations is determined from known mechanical properties in a manner identical to the embodiment depicted in FIG. 2. Once the group of streams with the highest data rates has been selected, and the suitable available storage location with the highest raw data rate has been selected in block 360, control moves to block 370.

At block 370, the system performs a recording and error recovery process wherein the group of streams selected in block 340 is checked for errors, attempts are made to correct any errors, and the group of streams is recorded on the storage location selected in block 360. Preferably, the error recovery process is as depicted in FIG. 4, to be described later. The recording process may also include the creation or alteration of a data file associating any flags placed on the streams during the MPEG identification process and the transmission data rate determination process with one of the file names for the selected streams of MPEG data and the selected storage location. Once the group of streams with the highest data rates is recorded on the storage location with the highest data rate on the storage media 10, control moves to block 380.

At block 380, the system checks for any remaining groups of streams to be recorded. If at least one group of streams to be recorded is found at block 380, control moves to block 385. If groups of streams to be recorded are not found at block 380, control moves to block 390.

At block 385, control moves to block 340. Thus, the group data rate selection process, the search for suitable available storage locations, the raw data rate selection process, and the recording and error recovery process are repeated until all of the groups of streams created in block 330 are recorded on the storage media 10.

At block 390, control moves to block 195. At block 195, the process is finished.

Other embodiments of the method of storing streams of MPEG data on a storage media may include, for example, a process of matching the transmission data rate of a selected stream or group of streams to be recorded with a substantially similar raw data rate of an available storage location. For hard disk drives, however, the raw data rates are significantly higher than MPEG stream bit rates.

The present invention includes a method for recovering errors in streams of MPEG data by selectively implementing error recovery according to the content of the stream of MPEG data. The method of error recovery may be used in conjunction with the method for storing streams of MPEG data depicted in the previously mentioned embodiments of FIGS. 1, 2, and 3, blocks 170, 270, and 370 respectively, or it may be used at other times when a stream of MPEG data is transmitted for sending, copying, playing, or other purposes.

FIG. 4 is a block diagram illustrating an exemplary process of recovering errors in streams of MPEG data. The process begins at block 400 and control passes to block 405. At block 405 the system detects data being transmitted between a storage media 10 and an unspecified system bus, and control passes to block 410. At block 410, the system scans the data being transmitted to determine if the data comprises streams of MPEG data. If the data is determined to not be MPEG data, control passes to block 415. If the data is determined to be a constituent frame of a stream of MPEG data, control passes to block 425.

At block 415, control passes to block 420. At block 420, the system performs a standard error recovery used for non-MPEG data, and control moves to block 490.

At block 425, control passes to block 430. At block 430, the system checks the constituent frames of the stream of MPEG data to determine whether there are any errors. If no errors are found at block 430, control moves to block 435. If at least one error is found at block 430, control moves to block 440.

At block 435, control passes to block 490.

At block 440, control passes to block 445. At block 445, the system implements at least one type of error recovery algorithm. The attempt to recover errors should be limited to an amount of time insufficient to cause a break or delay in the output associated with the stream of MPEG data. The type of error recovery algorithm used may include, for example, an attempt to rewrite the sector of the storage media 10 used, reprogramming the read channel parameters, or a search for the data located slightly off of the center of the track on the storage media 10. Once the predetermined time for the attempt at error recovery is expired, control moves to block 450. At block 450, the system determines the type of frame of MPEG data in which the error was found. If the frame in which the error was found is determined in block 450 to be an I-frame, control passes to block 455. If the frame in which the error was found is determined in block 450 to be a P-frame, control passes to block 460.

Finally, if the frame in which the error was found is determined in block 450 to be a B-frame, control passes to block 480.

At block 455; control returns to block 430. Thus, according to this embodiment, iterative error recovery is attempted for I-frames until no error is found in block 430.

At block 460; control moves to block 465. At block 465, the system determines if the P-frame in which the error was found is usable or unusable. The criteria to determine whether the P-frame is usable may include, for example, the number of frames in the stream of MPEG data which refer to the P-frame in which the error was found, the location of the error within the P-frame and the criticality of that location, the number of or time spent in iterations of error recovery that have been attempted on the P-frame. If the P-frame in which the error was found is determined in block 465 to be usable, control moves to block 470. If the P-frame in which the error was found is determined to be unusable, control moves to block 475.

At block 470, control moves to block 490.

At block 475, control returns to block 430. Thus, according to this embodiment, iterative error recovery is attempted for P-frames until criteria for usability are met in block 465.

At block 480, control moves to block 490.

At block 490, the data is transmitted toward its destination which may be, for example, a selected storage location on a storage media, a display device, or another part of the system, and control moves to block 495. At block 495, the process finishes.

Other embodiments of the method of recovering errors in streams of MPEG data may, for example, apply usability criteria similar to those used in block 460 to determine if an I-frame is usable before initiating another iteration of error recovery attempts, eliminate usability criteria for P-frames by moving control from block 460 directly to block 490. Furthermore, additional embodiments may determine how critical an error is within a frame, and place emphasis on recovering errors that are more visible to the user based upon the location of the error within the frame. This additional option may be performed in conjunction with or in lieu of determining whether the error exists in an I-, B-, or P-frame.

Figure 6:
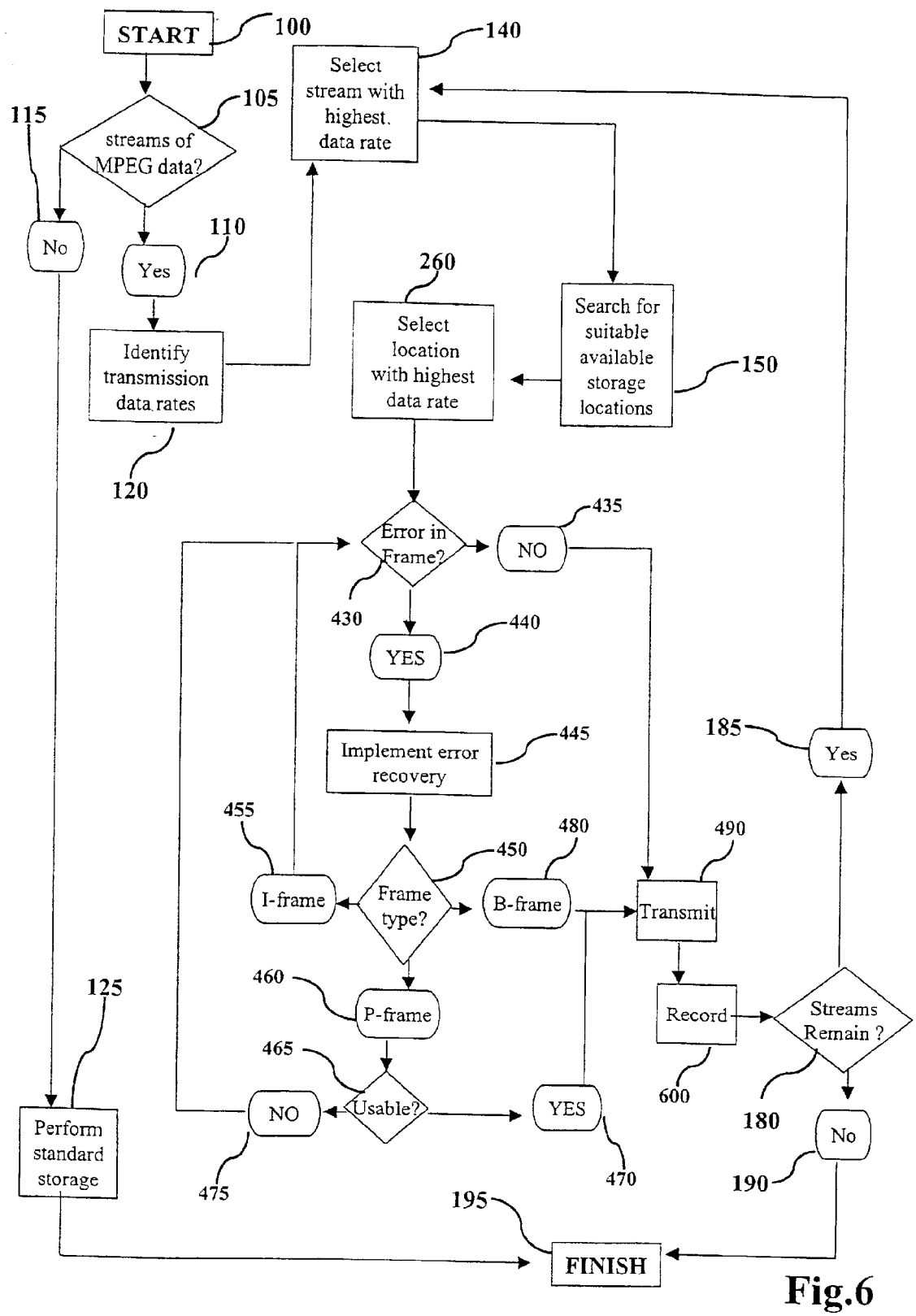
FIG. 6 is a flow diagram illustrating selection of storage locations based upon raw data rate and selective implementation of error recovery based upon the content of the stream of MPEG data.

FIG. 6 illustrates an embodiment of the invention wherein the storage locations 20 on the storage media 10 are selected according to their raw data rate, and error recovery is selectively implemented according to the content of the stream of MPEG data.

More specifically, this embodiment performs the MPEG identification process 105, the transmission data rate determination process 120, the transmission data rate selection process 140, the search for available storage locations 150, and the raw data rate selection process 260 in the same manner as the embodiment depicted in figure number 2. Once the storage location with the highest raw data rate has been selected in block 260, control moves to block 430.

At block 430, the system checks individual frames for errors in the same manner as in the embodiment pictured in FIG. 4. The system also implements error recovery, identifies the type of frame, determines the usability of a P-frame, and transmits data in the same manner as in blocks 445, 450, 465, and 490, respectively, in FIG. 4. In this embodiment, the data is transmitted in block 490 to the selected storage location from block 260 on the storage media 10, and control moves to block 600.

In block 600, the data is stored on the selected storage location, and control moves to block 180. At block 180, the system checks for remaining streams of MPEG data to be recorded, in the same manner as the embodiment illustrated in FIG. 2.

In the embodiment depicted in FIG. 6, the standard storage procedure at block 125 may include a standard error recovery similar to that depicted in block 420 in FIG. 4. Furthermore, the MPEG identification process at block 105 replaces the procedure at block 410 in FIG. 4.

While the invention has been described with reference to the certain illustrated embodiments, the words which have been used herein are words of description, rather than words or limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather extends to all equivalent structures, acts, and materials, such as are within the scope of the appended claims.

What is claimed is:

1. A method for storing and recovering errors in streams of Moving Pictures Experts Group (MPEG) data on a storage media comprising:

determining that at least one stream of data being transmitted from a system bus to the storage media comprises at least one stream of MPEG data;

identifying a transmission data rate of said at least one stream of MPEG data, selecting a storage location from among a set of available storage locations on the storage media, said selected storage location facilitating optimum bandwidth playback for an output display of said at least one stream of MPEG data;

selectively implementing at least one type of error recovery algorithm on said at least one stream of MPEG data, based on the determination that the at least one stream of data comprises at least one stream of MPEG data, to maximize the transmission bandwidth of said at least one stream of MPEG data; and storing said at least one stream of MPEG data in said selected storage location on the storage media.

2. The method of claim 1, wherein a level of susceptibility to external shock and vibration of each member of said set of available storage locations on the storage media is determined, and a storage location with a predetermined level of susceptibility to external shock and vibration is selected.

3. The method of claim 2, wherein a stream of MPEG data having a high transmission data rate is given recording priority on said selected storage location with said low level of susceptibility to external shock and vibration.

4. The method of claim 1, wherein a raw data rate is identified for each of said set of available storage locations on the storage media, and a storage location with a raw data rate proportional to the transmission data rate of the stream of MPEG data is selected.

5. The method of claim 4, wherein a stream of MPEG data having the highest transmission data rate among said at least one stream of MPEG data is given recording priority on a storage location having the highest raw data rate among said set of available storage locations on the storage media.

6. The method of claim 1, further comprising:

placing said at least one stream of MPEG data in at least one group, the streams in each group having similar data rates;

identifying a raw data rate for each of said set of available storage locations on the storage media;

selecting a respective storage location for each group, said selected respective storage location having a raw data rate proportional to the transmission data rates of the streams in the group; and assigning each group recording priority on said selected respective storage location.

7. The method of claim 6, wherein a storage location having the highest raw data rate is selected as said respective storage location and a group having the highest transmission data rates is assigned recording priority on said selected respective storage location.

8. The method of claim 1, further comprising:

performing an identification of an individual frame of said at least one stream of MPEG data as one of an I-frame, a P-frame, or a B-frame; and selectively implementing said at least one error recovery algorithm based upon said identification of said individual frame.

9. The method of claim 8 further comprising allocating more time to implement said at least one error recovery algorithm on I-frames than on P- or B-frames.

10. The method of claim 8, further comprising implementing said at least one error recovery algorithm on a sub-frame level, according to how critical an error is within a given part of the frame.

11. The method of claim 1, further comprising implementing said at least one error recovery algorithm on a sub-frame level, according to how critical an error is within a given part of the frame.

12. A method for recovering errors in streams of Moving Pictures Experts Group (MPEG) data comprising:

determining that at least one stream of data being transmitted between a system bus and a storage media comprises at least one stream of MPEG data; and selectively implementing at least one type of error recovery algorithm on said at least one stream of MPEG data, based on the determination that the at least one stream of data comprises at least one stream of MPEG data, to maximize transmission bandwidth of said at least one stream of MPEG data;

performing an identification of an individual frame of said at least one stream of MPEG data as an I-frame, a P-frame, or a B-frame:

determining whether an identified P-frame is usable; and selectively carrying out iterative error recovery on the identified P-frame based upon the usability determination.

13. The method of claim 12, further comprising allocating more time to implement said at least one type of error recovery algorithm on I-frames than on P- or B-frames.

14. The method of claim 12, wherein determining whether an identified P-frame is usable comprises determining whether a number of frames in the at least one stream of MPEG data which refer to the identified P-frame having an error, a location of an error within the identified P-frame and a criticality of that location, a number of iterations of error recovery that have been attempted on the identified P-frame, or time spent carrying out iterative error recover on the identified P-frame.

15. A system for storing and recovering errors in streams of Moving Pictures Experts Group (MPEG) data on a storage media comprising:

determining that identifying at least one stream of MPEG data being transmitted from a system bus to the storage media comprises at least one stream of MPEG data;

identifying a transmission data rate of said at least one stream of MPEG data;

selecting a storage location from among a set of available storage locations on the storage media, said selected storage location maximizing the bandwidth for an output display of said at least one stream of MPEG data;

selectively implementing at least one type of error recovery algorithm on said at least one stream of MPEG data, based on the determination that the at least one stream of data comprises at least one stream of MPEG data to maximize transmission bandwidth of said at least one stream of MPEG data; and storing said at least one stream of MPEG data in said selected storage location on the storage media.

16. The system of claim 15, wherein a level of susceptibility to external shock and vibration of each member of said set of available storage locations on the storage media is determined, and a storage location with a low level of susceptibility to external shock and vibration is selected.

17. The system of claim 16, wherein a stream of MPEG data having a high transmission data rate is given recording priority on said selected storage location with said low level of susceptibility to external shock and vibration.

18. The system of claim 15, wherein a raw data rate is identified for each of said set of available storage locations on the storage media, and a storage location with a raw data rate similar to the transmission data rate of the stream of MPEG data is selected.

19. The system of claim 18, wherein a stream of MPEG data having the highest transmission data rate among said at least one stream of MPEG data is given recording priority on a storage location having the highest raw data rate among said set of available storage locations on the storage media.

20. The system of claim 15, further comprising:
placing said at least one stream of MPEG data in at least one group, the streams in each group having similar data rates;
identifying a raw data rate for each of said set of available storage locations on the storage media;
selecting a respective storage location for each group, said selected respective storage location having a raw data rate proportional to the transmission data rates of the streams in the group; and
assigning each group recording priority on said selected respective storage location.

21. The system of claim 20, wherein a storage location having the highest raw data rate is selected as said respective storage location and a group having the highest transmission data rates is assigned recording priority on said selected respective storage location.

22. The system of claim 15, further comprising:
performing an identification of an individual frame of said at least one stream of MPEG data as one of an I-frame, a P-frame, or a B-frame; and
selectively implementing said at least one error recovery algorithm based upon said identification of said individual frame.

23. The system of claim 22 further comprising allocating more time to implement said at least one error recovery algorithm on I-frames than on P- or B-frames.

24. The system of claim 15, further comprising implementing said at least one error recovery algorithm on a sub-frame level, according to how critical an error is within a given part of the frame.

* * * * *